July 4, 1961
B. B. BOMBARGER ET AL
2,990,944
AUTO AND BOAT EMERGENCY KIT
Filed Oct. 8, 1958
2 Sheets-Sheet 1
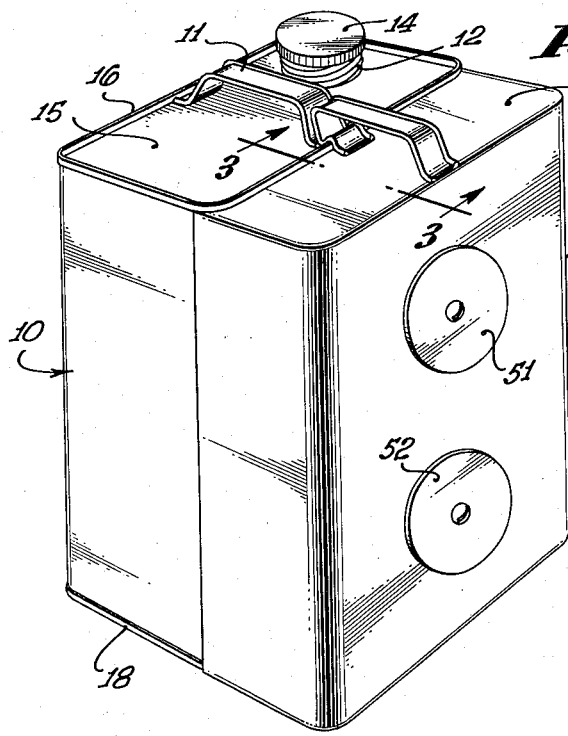
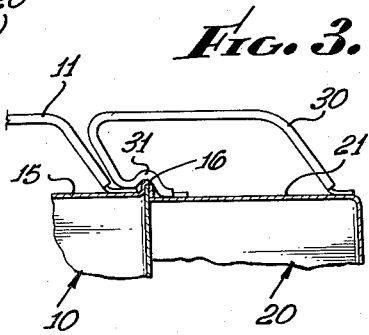
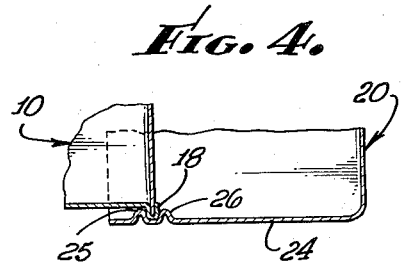
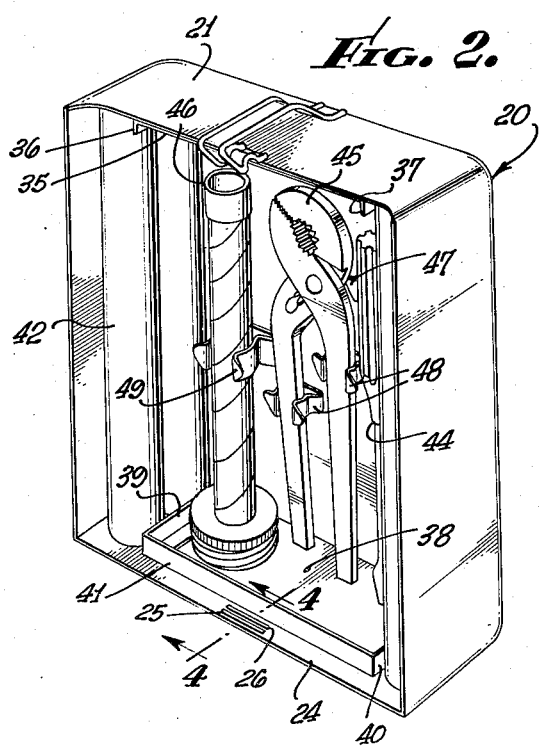
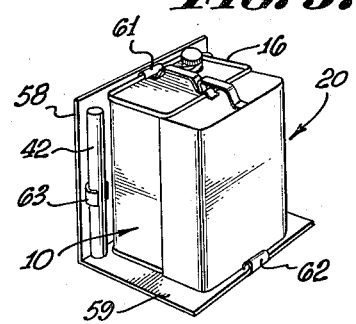
FRANK J. HILL
BERTON B. BOMBARGER
INVENTORS.
BY Herzig & Jessup
ATTORNEYS.

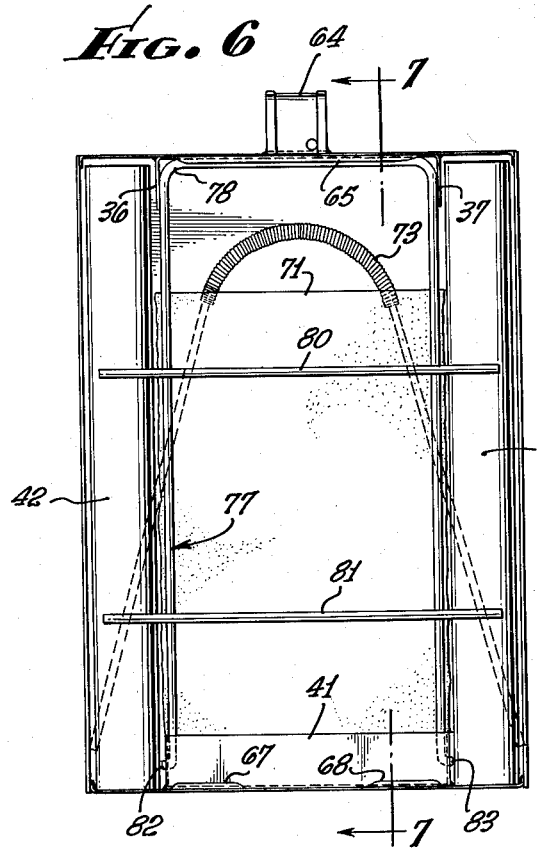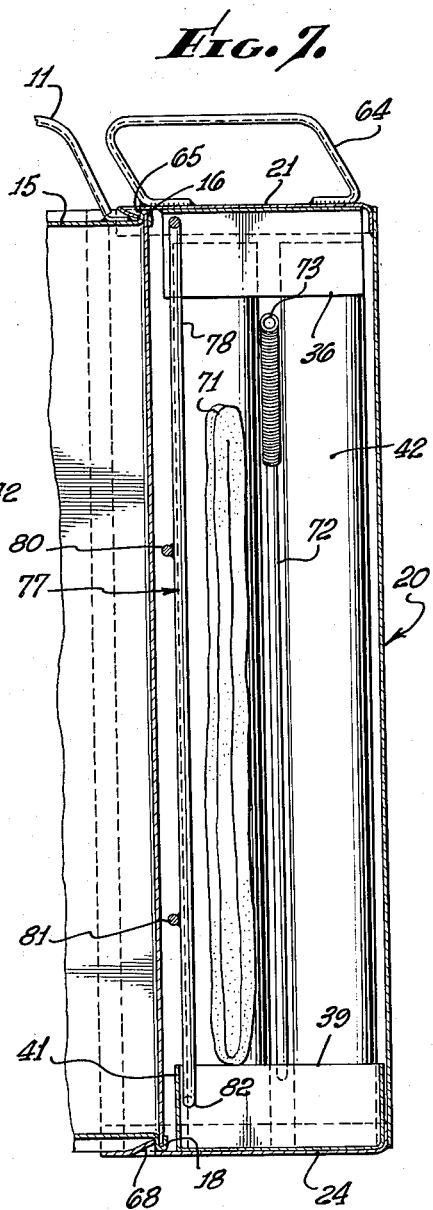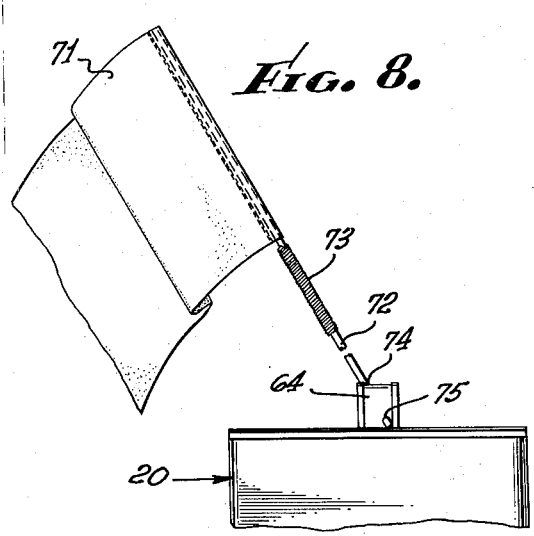

United States Patent Office 2,990,944
Patented July 4, 1961

2,990,944
AUTO AND BOAT EMERGENCY KIT
Berton B. Bombarger, 3571 E. 56th St., Maywood, Calif., and Frank J. Hill, 5241 Angeles Vista Blvd., Los Angeles 43, Calif.
Filed Oct. 8, 1958, Ser. No. 766,067
8 Claims. (Cl. 206—1)

This invention relates to an emergency kit containing spare gasoline, and emergency equipment, adapted especially for use in automobiles and/or boats.

The purpose of the invention is to provide a unitary kit equipped with those necessaries that may be required to meet an emergency in connection with automobile or boat transportation. The invention provides a kit in which the emergency equipment is kept together in an orderly way in one place so as to be readily available and accessible in the event of an emergency. The emergency equipment including the spare gasoline and the other components are contained in a single unit which may be carried, transported and stored as a unit ready for immediate use at the time of an emergency.

In a preferred form of the invention the kit comprises a can of conventional construction, having spare gasoline in it, with an open sided container containing the other emergency equipment attached to the side of the gas can and adapted to be carried and stored with it.

The primary object of the invention is therefore, to provide a unitary emergency kit for use in automobiles or boats containing the basic equipment and supplies necessary to meet such emergencies as may arise in the ordinary course of automotive or boat travel.

Another object of the invention is to provide a novel auto and boat emergency kit comprising a container of spare fuel, having attachable to it an open sided container containing emergency equipment and supplies, the entire unit being adapted for carrying, transporting and storing as an integrated kit.

A further object of the invention is to provide an emergency kit as in the foregoing comprising a rectangular fuel container having a carrying handle, and an open sided container attachable to a side-wall of the fuel container and having therein emergency equipment which may be most useful in common types of emergencies.

A further object of the invention is to provide an emergency kit as in the foregoing object wherein the fuel container is a type having a peripheral rib around its top and bottom ends, the open sided container being shaped to fit over the fuel container at the bottom thereof and having means to mutually engage with the rib at the bottom of the fuel container, and the open sided container being shaped at the top to conform to the contour of the fuel container and having means to clip the open sided container to the rib at the top of the fuel container.

Further objects and advantages and additional features of novelty in the invention will become apparent from the following detailed description and annexed drawings wherein:

FIG. 1 is a perspective view of the emergency kit of the invention;

FIG. 2 is a perspective view showing the interior of the open sided container or compartment of the invention;

FIG. 3 is a detail sectional view taken along the line 3—3 of FIG. 1 showing a manner of attachment of the open sided compartment to the container at the upper part thereof;

FIG. 4 is a detail view taken along the line of 4—4 of FIG. 2 showing the detent structure at the bottom of the open sided compartment for attaching it to the container at the bottom thereof;

FIG. 5 is a perspective view showing a way of carrying or mounting the emergency kit in a boat or auto;

FIG. 6 is a detail view of a modified form of the invention.

FIG. 7 is a sectional view taken along line 7—7 of FIG. 6.

FIG. 8 is a view of the device of FIGS. 6 and 7 supporting an emergency flag.

Referring more particularly to FIG. 1 of the drawings number 10 designates generally a gasoline can or container of commercial type. The can is generally rectangular as shown with rounded corners and having a carrying handle 11, a screw threaded filling and pouring opening 12 and a screw threaded cap 14. The top is indicated at 15 and it has a continuous peripheral rib 16 formed by the side edges of the top being folded or rolled over to form a joint with the upper edges of the side walls as may be seen in FIG. 3. The side edges of the handle 11 are rolled over to form a rib or bead along the sides of the handle as shown. Numeral 18 designates a similar continuous peripheral bead or rib around the bottom edges of the can or container 10.

Numeral 20 designates generally an open sided compartment or container having substantially the same width, depth and height dimensions as the can 10 and having similarly outer rounded corners as shown. The top of the compartment 20 as indicated at 21 is slightly lesser in depth than the bottom and side walls so that the compartment 20 is adapted to fit against a side of the can 10 with the can 10 partly nested into the compartment 20 as may be seen in FIG. 1.

Means are provided for securely attaching the compartment 20 to the side of the can 10. The top wall 21 of the compartment 20 has an inwardly extending bead or ridge as shown at 23 formed by the material of the top being struck inwardly. The bottom wall 24 of the compartment 20 has two inwardly extending ridges or beads as shown at 25 and 26 formed by the material of the bottom wall being struck inwardly. When the compartment 20 is fitted against the side of the can the rib or bead 18 at the lower part of can 10 on the one side fits between the ribs or beads 25 and 26. FIG. 4 shows the manner in which the rib 18 at the bottom of the can fits between the ribs or beads 25 and 26.

The compartment 20 has a carrying handle 30 attached to its top this handle being similar to the handle 11 on the can 10. It is offset to the left as shown however and its legs are inclined towards the can 10 as shown, so as to bring the handle 30 into juxta-position to the handle 11 when the compartment 20 is attached. This enables a person to carry the entire unit, that is the entire kit, with the fingers grasping both of the handles 11 and 30, although the entire kit may be carried simply by the handle 11 since the attachment of the compartment 20 to the can 10 is sufficiently secure and rigid that the weight in the compartment 20 can be supported by the attachment. The leg of handle 30 adjacent can 10 has a deformation 31 forming a spring clip which clips over bead 16 to secure compartment 20 to can 10 at the top.

The compartment 20 has provided therein items of emergency equipment which are most useful and necessary to meet basic emergencies such as may be encountered in automotive or boat travel.

Attached to the underside of the top 21 of the compartment 20 is a plate 35 having downwardly extending flanges 36 and 37. Similarly attached to the inside of the bottom 24 of compartment 20 is a plate 38 having upwardly extending flanges 39 and 40 which lie in planes parallel to the flanges 36 and 37. The flanges as described serve the purpose of having secured or held between them and the side walls of the compartment 20, the flares or fuses as indicated at 42. The outer edges of flanges 39 and 40 have a plate 41 extending there-across which forms a container in the bottom of the compartment 80 for holding any small loose material which it may be desired to have in the emergency kit.

The items of emergency equipment may, by way of example, include screw driver 44, pliers 45 and pouring spout 46 for can 10 held by spring clips 47, 48, and 49 respectively.

The compartment 20 has two red reflector discs 51 and 52 attached to its outer closed side by rivets as shown which serve the purpose of an emergency night signalling or warning device when the kit is set on the highway near an accident or other emergency.

In FIG. 5, numeral 58, designates an upright backing member attachable to a wall or bulkhead and having a shelf or platform 59 extending outwardly therefrom. The emergency kit of the invention sets on the shelf or platform 59 and is held thereon by spring clips one of which designated at 61 extends out from the top of the upright member 58 and clips over the peripheral rib 16, at the top of the can 10. At the outside edge of the platform 59, is another spring clip 62 which abuts against the bottom of the compartment 20. Thus the emergency kit is held readily available for immediate use and can be moved and taken off of the platform 59, simply by releasing the spring clip 61 and lifting the kit out. Numeral 63 designates a spring clip or bracket holding an additional fuse to the upright backing member 58.

From the foregoing, those skilled in the art will observe that the invention provides a very convenient and utilitarian self-contained integrated emergency kit including spare fuel such as gasoline and such emergency items of equipment as are or may be indispensable at times of sudden emergency in connection with automotive or boat travel. The items of emergency equipment are kept together and collected by the kit, which is readily transportable and carriable as a unit and which can be readily stored and maintained in readiness for immediate emergency use.

FIGS. 6 and 7 show a slightly modified form of the invention wherein like parts have numeral designations like those of the previous embodiment.

In the form of the invention as shown in FIG. 6 the handle 64 for the compartment 20 does not have the spring clip formation to clip over the rib 16 of the can 10; in this form the legs of the handle 30 attach to the top of the compartment 20 and are inclined slightly towards the handle 11 of the can 10 so that both handles can be grasped together. The compartment 20 has a bead or rib 65 formed on the inside of its top as shown which clips over the rib 16 at the top of can 10. The bottom 24 of compartment 20 has a pair of beads or ribs 67 and 68 which clip over the bead 18 at the bottom of can 10.

The device of FIGS. 6 and 7 has flanges 36 and 37, 39 and 40, and a cross plate 41 as in the previous embodiment.

The space within the compartment inside of the flanges is provided for additional emergency equipment which may be stored loosely therein. Means are provided to hold such additional equipment in that space. The additional equipment may include a small red danger flag stored in folded condition as shown at 71. A staff for the flag which is collapsible is shown at 72. The staff comprises two lengths of wire as shown connected intermediately by a helical spring section as shown at 73 which permits the staff to be collapsed or doubled over for folding and storing in the space as described. When the staff is taken out of the compartment and released it expands into a straight length which can then have the flag placed thereon at one end, and the other end inserted into openings 74 and 75 in the handle 64 of the compartment 20 so that the flag is held in a more or less upright position. The entire emergency kit or the compartment 20 by itself may be placed in a suitable position on the road or highway with the flag erected as a warning signal, as seen in FIG. 8.

The means or device for holding the emergency equipment in place in the center part of the compartment 20 comprises a gate member or grill 77 comprising an inverted U-shaped member 78 having transverse rods or wire 80 and 81 welded thereto as shown. The bottom ends of the legs of the U-shaped member 79 are turned outwardly and journaled in openings as shown at 82 and 83 in the flanges 39 and 40. Thus the gate 77 can be swung outwardly and inwardly to a position wherein its top transverse member is held behind the rib or bead on the inside of the top 21 of the compartment 20.

The kit is formed in a novel and highly effective and economical manner by way of the attachment of the open sided compartment or container to the side of the gasoline can. The open sided compartment is readily transportable with the can and is readily removable for access to the emergency equipment. The unit, furthermore, serves when set in the highway as an emergency signaling unit by way of the red flag in daylight hours or by way of the red reflectors at night.

The can 10 may be, of course, a can of conventional type as known commercially. The compartment 20 may be constructed of thin sheet metal of substantially the same gauge as the can and may be fabricated by known methods of construction such as welding and the like. The compartment 20 may be made of other suitable materials such as plastic.

The herein disclosure is representative of preferred forms of the invention and is to be interpreted in an illustrative rather than a limiting sense. It is to be understood that various modifications and alternatives may occur to and may be adopted by those skilled in the art all coming within the realm and scope of the invention which is to be determined in accordance with the claims appended hereto.

What we claim as new and desire to secure by Letters Patent is:

1. In an auto and boat emergency kit, in combination: a first container having a carrying handle and adapted to contain a liquid, said container having a peripheral bead formed around its top and bottom ends, an open-sided removable container shaped to have its open side fitted against a side of the first container, said open-sided container containing emergency equipment, means for securely attaching the open-sided container to the said first container, said last means comprising beads formed in the bottom of the open-sided container adapted to have engagement with the peripheral bead at the bottom of the first container and means forming a spring clip at the top of the open-sided container adapted to be clipped over the peripheral bead at the top of the first container.

2. In an auto and boat emergency kit, in combination: a first container adapted to contain a liquid and having a carrying handle, said container having a peripheral bead around its top and bottom ends, an open-sided removable container adapted to fit against a side of the first container, said open-sided container containing emergency equipment and being shaped at the lower part thereof to have the lower part of the first container nest therein, the top of said open-sided container having a contour shape to fit contiguously against the side of the first container and means for securely attaching the open-sided container to the first container.

3. The structure of claim 2 wherein the open-sided container has beads formed in its bottom in a position to have the peripheral bead at the bottom of the first container engaged therebetween, and said open-sided container having means at its top forming a spring clip adapted to be clipped over the peripheral bead at the top of the first container.

4. In an auto and boat emergency kit, in combination: a first container comprising a gasoline can having a carrying handle and a screw cap and a peripheral bead around its top and bottom ends, an open-sided removable container shaped to have its open side fitted against a side of the first container, said open-sided container containing emergency equipment, said open-sided container being shaped to have the first container partly nest therein, the top of the open-sided container having a contour shape to fit contiguously against a side of the first container below the peripheral bead at the top thereof, means formed in the bottom of the open-sided container adapted to engage the peripheral bead at the bottom of the first container, and a carrying handle formed at the top of the open-sided container and having a portion offset from the side of the open-sided container, said offset portion having spring clip means formed therein adapted to be clipped over the peripheral bead at the top of the first container whereby the open-sided container is securely attached to the first container and may be carried therewith.

5. In an auto and boat emergency kit, in combination: a first container comprising a generally rectangular gas can having a carrying handle and a screw cap, said container having a peripheral bead around its top and bottom ends, an open-sided removable container adapted to be fitted against a side of the first container, said open-sided container containing emergency equipment, said open-sided container being shaped to have a side of said gas can nest partly therein, and the top and bottom of said open-sided container having means adapted to engage with the peripheral beads at the top and bottom of the gas can on the side thereof engaged by the open sided container.

6. The kit of claim 5 wherein the can and the open-sided container each have a carrying handle at the top, said carrying handles having closely juxtaposed portions so that the kit can be carried when assembled by grasping both handles and each part of the kit may be carried separately.

7. In an auto and boat emergency kit, in combination: a first container comprising a gasoline can having a carrying handle and a screw cap, said can being generally rectangular and having a peripheral bead around its top and bottom ends, an open sided container adapted to be attached to a side of the first container, said open sided container containing emergency equipment, said open sided container being shaped at the bottom to have the lower part of the first container nest therein, the bottom of the open sided container having a pair of beads struck up therefrom and adapted to have engagement with the bead at the bottom of the first container, the top of the open sided container having a contour shaped to conform contiguously to a side of the first container below the bead at the top thereof, said open sided container having a carrying handle attached to the top thereof, said carrying handle having an offset portion adapted to overlay the top of the first container, and said offset portion being shaped to form a spring clip adapted to be clipped over the bead at the top of the first container for securing the open sided container thereto.

8. In an auto and boat emergency kit, in combination: a first container comprising a gas can having a carrying handle, said can having a peripheral bead around its top and bottom ends, a container having an open side adapted to be fitted against a side of the first container, said second container containing emergency equipment, said second container being shaped to have a side of said first container partly nest snugly therein and having means within it to limit the nesting of the first container, said second container having means in its top and bottom engageable with the beads at the top and bottom of the first container to retain the second container, and a swingably mounted grill in the second container for retaining articles therein when the second container is not secured to the first container.

References Cited in the file of this patent

UNITED STATES PATENTS

| | | |
|---|---|---|
| 1,514,885 | Bigler | Nov. 11, 1924 |
| 2,522,230 | Komulaine | Sept. 12, 1950 |
| 2,825,085 | Ingraham | Mar. 4, 1958 |

FOREIGN PATENTS

| | | |
|---|---|---|
| 116,607 | Great Britain | June 20, 1918 |
| 255,698 | Italy | Nov. 3, 1927 |
| 456,287 | Germany | Feb. 20, 1928 |